United States Patent [19]
Hosch et al.

[11] Patent Number: 5,984,083
[45] Date of Patent: Nov. 16, 1999

[54] CONVEYOR BELT TENSIONING MECHANISM UTILIZING A MANUALLY OPERATED CAM-TYPE TOOL

[75] Inventors: Michael A. Hosch, Oconomowoc; Scott M. Hall, Franklin, both of Wis.

[73] Assignee: Dorner Mfg. Corp., Hartland, Wis.

[21] Appl. No.: 08/814,101

[22] Filed: Mar. 10, 1997

[51] Int. Cl.⁶ ................................................. B65G 15/00
[52] U.S. Cl. ........................................ 198/810.04; 198/816
[58] Field of Search .................................. 198/813, 816, 198/810.04, 812; 474/136, 130; 254/243, 15, 17, 16, 114

[56] References Cited

U.S. PATENT DOCUMENTS

| | | | |
|---|---|---|---|
| 704,388 | 7/1902 | Schwingel | 198/813 |
| 3,220,691 | 11/1965 | Dudley | 254/15 |
| 4,007,827 | 2/1977 | Mattos | 198/813 |
| 5,156,260 | 10/1992 | Dorner et al. | 198/813 |
| 5,174,435 | 12/1992 | Dorner et al. | 198/813 |
| 5,265,714 | 11/1993 | Hansen | 198/813 |
| 5,503,265 | 4/1996 | Hussar et al. | 198/813 |
| 5,511,650 | 4/1996 | Hurworth | 198/813 |
| 5,632,372 | 5/1997 | Steinbuchel, IV et al. | 198/813 |
| 5,797,481 | 8/1998 | Uber et al. | 198/813 |

FOREIGN PATENT DOCUMENTS 1033126B 6/1958 Germany .
252847 6/1926 United Kingdom .

*Primary Examiner*—Robert P. Olszewski
*Assistant Examiner*—Isobel A. Parker
*Attorney, Agent, or Firm*—Andrus, Sceales, Starke & Sawall

[57] ABSTRACT

A conveyor belt tensioning mechanism for use with a conveyor having a frame, a conveyor member in the form of a belt, and a pair of rollers, includes a pair of tensioning members mounted to opposite sides of the conveyor frame, with one of the rollers being mounted to the tensioning members. The tensioning members are slidable between extended and retracted positions by means of a pair of fasteners extending through a slot formed in each tensioning member and interengaged with the frame via a locking sleeve. The fasteners extend through a locking plate, such that tightening the fasteners frictionally engages the tensioning member between the frame and the locking plate. The belt is tensioned by loosening the locking fasteners and engaging a tensioning tool with the frame adjacent each tensioning member. The tensioning tools are pivoted into engagement with the tensioning members, and include a cam surface which forces the tensioning members outwardly to an extended position for tensioning the belt. The locking screws are then tightened to maintain the tensioning members in the extended position. Belt tracking can be adjusted utilizing a cam member mounted to the tensioning member, which is engageable with the end of the frame side wall.

19 Claims, 3 Drawing Sheets

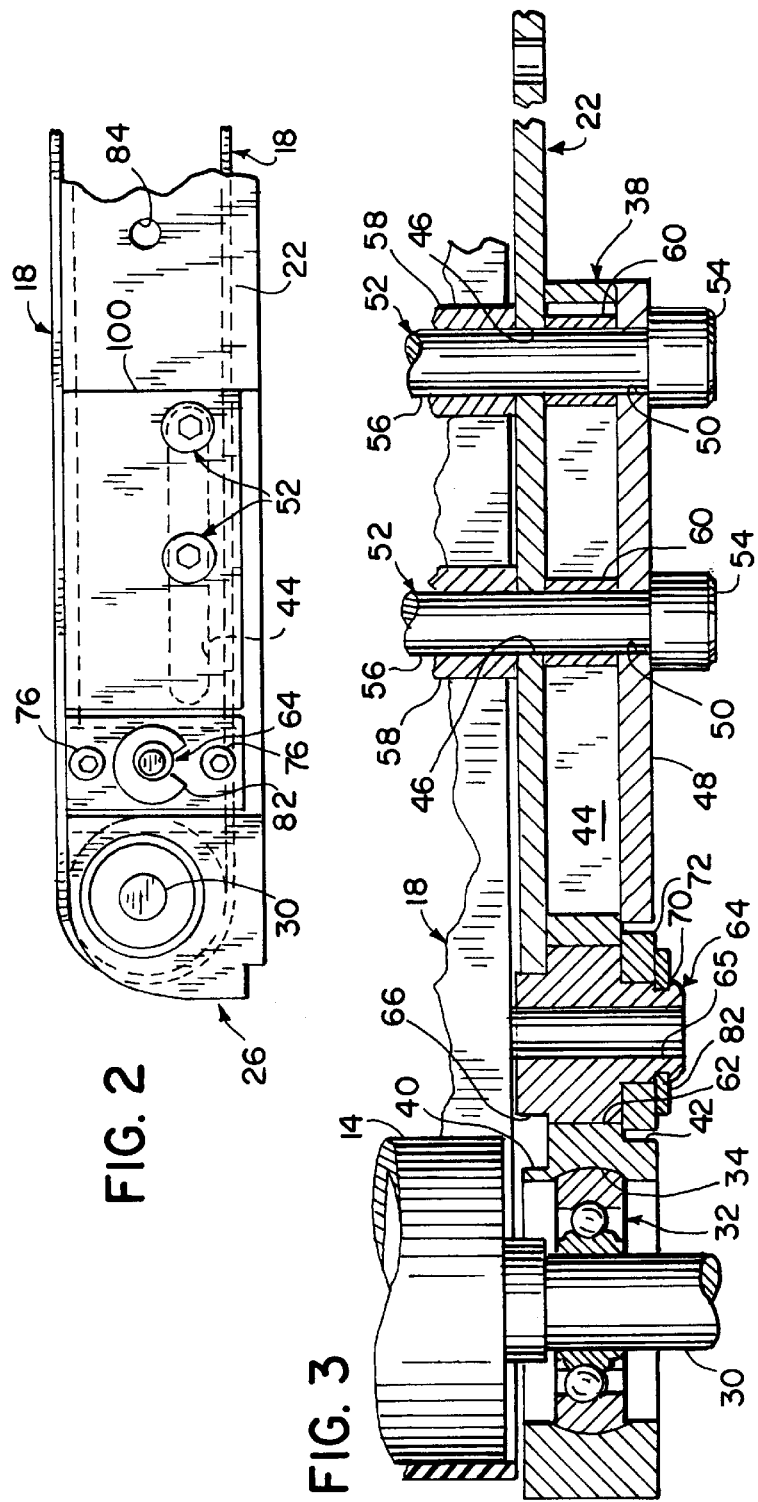

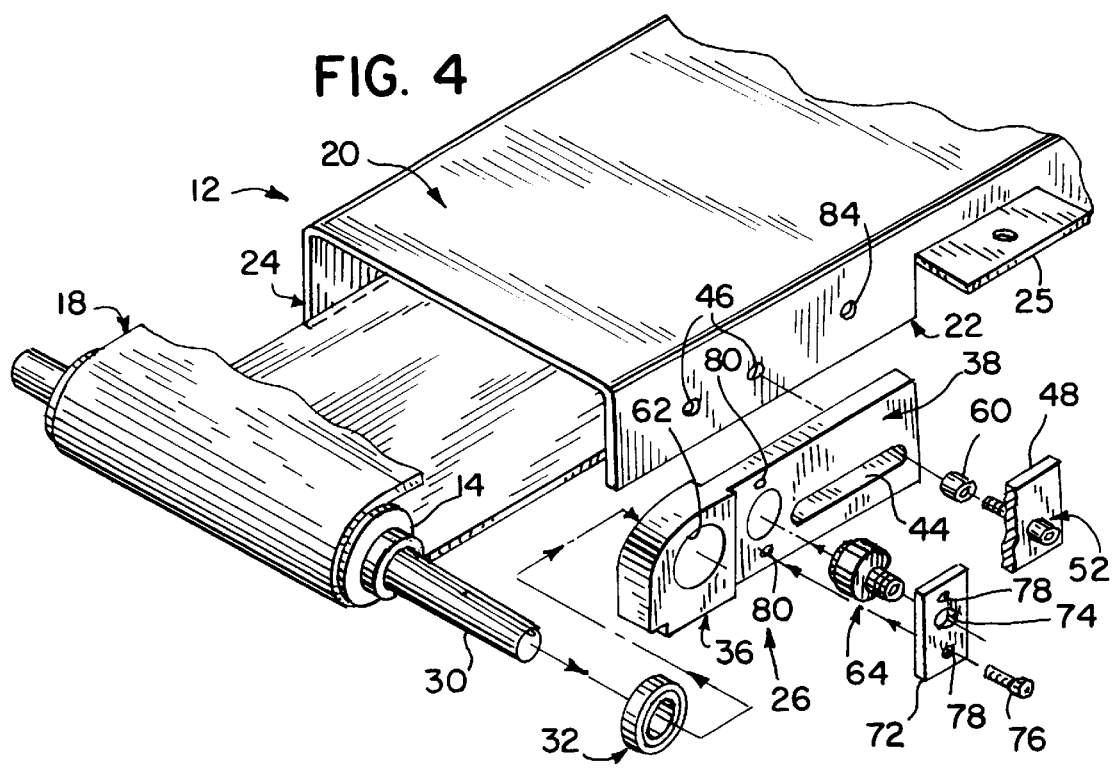

CONVEYOR BELT TENSIONING MECHANISM UTILIZING A MANUALLY OPERATED CAM-TYPE TOOL

BACKGROUND AND SUMMARY OF THE INVENTION

This invention relates to conveyors, and more particularly to a system for tensioning a conveyor belt.

A conveyor typically includes a frame, a pair of rollers rotatably mounted to the frame, and a belt trained about the rollers such that rotatably driving one of the rollers results in driving of the belt and thereby rotation of the other roller. The belt must be tensioned in order to provide positive engagement with the rollers to insure proper operation of the conveyor.

Various mechanisms are known in the prior art to tension a conveyor belt by adjusting the spacing between the rollers. One such mechanism is disclosed in Dorner et al U.S. Pat. No. 5,174,435 issued Dec. 29, 1992, and assigned to the same assignee as the present application. In this patent, one of the rollers is mounted to a pair of plates, each of which is slidably mounted to one side of the frame. Each plate is interconnected with an extension mechanism which includes a pair of gear racks located one adjacent each side of the conveyor frame. An elongated drive pinion is engaged with each gear rack and is rotatably mounted to the frame, such that rotation of the pinion is translated through the gear racks to the plates for adjusting the position of one roller relative to the other and to thereby control the belt tension. A locking mechanism selectively locks the plates to the frame for preventing movement of the plates when the roller is in a desired position, and a tracking mechanism provides adjustment of the roller position to ensure proper belt tracking.

The above-described belt tensioning mechanism is highly satisfactory and provides reliable and positive belt tensioning throughout a wide range of positions. However, the system involves a number of components which are mounted to the frame and the adjustment plates, all of which involve an associated manufacturing cost.

It is an object of the present invention to provide a low cost system for tensioning a conveyor belt. It is a further object of the invention to provide a belt tensioning system which is simple in its components and which is easily operable by a user. Yet another object of the invention is to provide a conveyor belt tensioning mechanism utilizing a specially designed tool, separate from both the conveyor frame and the tensioning plates, which is manually operable by a user to tension the belt.

The invention contemplates a belt tensioning system for a conveyor having a frame, a conveying member such as a belt, at least one roller, and at least one movable tensioning member mounted to the frame and to which the roller is rotatably mounted. The tensioning member is movable between an extended, tensioned position in which the belt is tensioned, and a retracted, release position for introducing slack into the belt. The belt tensioning system of the invention is in the form of a manually operable tensioning device, separate from both the frame and the tensioning plate, which is selectively engageable with and disengageable from the frame. The tensioning device is movable when engaged with the frame into engagement with the tensioning plate, for moving the tensioning plate to its tensioned position. A locking mechanism is operable to maintain the tensioning plate in its tensioned position, such that the tensioning device can be disengaged from the frame and the locking mechanism functions to thereafter maintain the tensioning plate in its tensioned position. In a preferred form, the tensioning plate is slidably mounted to the frame for movement between its tensioned and release positions. Engagement of the locking mechanism functions to frictionally engage the tensioning plate with the frame to prevent sliding movement of the tensioning plate relative to the frame. The manually operable tensioning device is preferably in the form of a tool having a handle, a cam surface spaced from the handle, and a pivotable mounting arrangement for pivotably mounting the tool to the frame. Pivoting movement of the tool relative to the frame engages the cam surface of the tool with the tensioning plate, to slide the tensioning plate to its tensioned position. The pivotable mounting arrangement for pivotably mounting the tool to the frame preferably includes a recess formed in the frame and a pin associated with the mounting tool which is received within the recess, such that the tool is pivotable relative to the frame about a pivot axis defined by the pin. The tensioning plate includes an engagement surface with which the cam surface of the tool is engaged for moving the tensioning plate to its tensioned position upon pivoting movement of the tool, and the tool includes a retainer surface engaged with the tensioning plate engagement surface when the tool is pivoted to a predetermined position relative to the frame to place the tensioning plate in its tensioned position, and engagement of the tool retainer surface with the plate engagement surface functions to maintain the tensioning plate in its tensioned position.

In a preferred form, the conveyor has a pair of tensioning plates mounted one to each side of the frame on opposite sides of the belt, and the roller is rotatably mounted to and extends between the pair of tensioning plates. A pair of manually operable tensioning devices, each of which is preferably in the form of a tool as set forth above, are movable to place both of the tensioning plates in their extended, tensioned positions. In a preferred form, the tensioning tools are synchronously movable to place the tensioning devices in their tensioned positions. In one form, a rod or shaft member is positioned within aligned openings in the handle members of the tools to span between the tools, and the portion of the rod spanning between the tools is manually engaged by the user to pivot the tools relative to the frame to synchronously move the tensioning plates to their tensioned positions.

The invention further contemplates a method of tensioning a conveyor belt in a conveyor mechanism, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view of a conveyor constructed according to the invention;

FIG. 2 is a partial enlarged side elevation view showing an end portion of the conveyor of FIG. 1;

FIG. 3 is a partial section view taken along line 3—3 of FIG. 1;

FIG. 4 is a partial exploded isometric view showing the end portion of the conveyor of FIG. 1;

FIG. 5 is a top plan view of the end portion of the conveyor of FIG. 1;

DETAILED DESCRIPTION OF THE INVENTION

Figure 6:
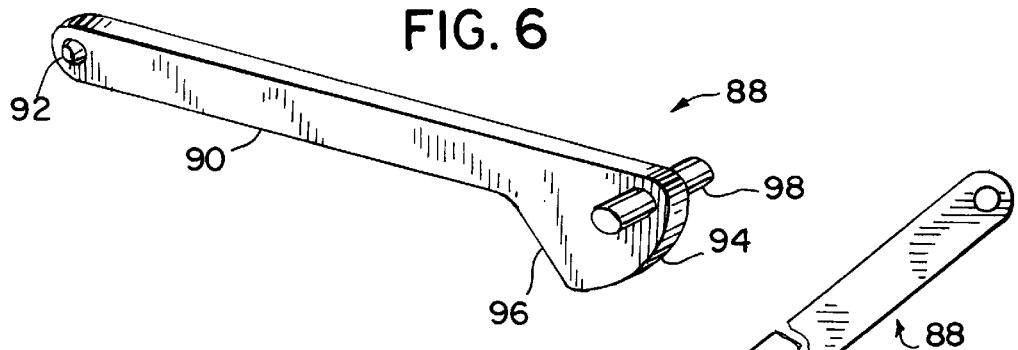
FIG. 6 is an isometric view of a tool used for tensioning the belt in the conveyor of FIG. 1.

Referring to FIGS. 1–4, a conveyor 10 is adapted for mounting to a base or other supporting structure (not shown), and is particularly useful for conveying relatively small parts or articles. Conveyor 10 generally includes an inverted U-shaped frame 12, a pair of rollers 14, 16, and a conveyor belt 18.

Frame 12 defines an upper wall 20 (FIG. 4) which functions as the bed plate of conveyor 10 to support the upper run of conveyor belt 18. Side walls 22 and 24 extend downwardly from the opposite sides of upper wall 12. Mounting ears, such as shown at 25, are formed in walls 22 and 24 for use in mounting conveyor 10 to a base or other supporting structure. This construction of frame 12 provides a relatively low cost yet high strength structure for supporting the various components of conveyor 10.

Referring to FIG. 1, upper wall 20 terminates inwardly of the rightward ends of side walls 22 and 24, providing an open area within which roller 16 is received. Roller 16 is mounted to a conventional spindle and bearing combination, and is fixed in position relative to frame 12.

At the end of conveyor 10 opposite roller 16, a pair of tensioning members 26 and 28 (FIG. 5) are mounted to frame side walls 22 and 24, respectively, and a spindle 30, which is mounted to roller 14, is rotatably supported by tensioning members 26. The ends of spindle 30 extend through spherical bearing assemblies 32, each of which is received within a passage, such as shown at 34, formed in the outer end of each of tensioning members 26, 28. With this construction, roller 14 is rotatably supported by tensioning members 26, 28, and extends therebetween.

Spindle 30 is constructed such that its end adjacent tensioning member 26 extends outwardly of tensioning member 26, and is adapted to receive a drive sheave for receiving input power from a drive motor (not shown).

Tensioning member 26 and its associated components will be described in detail with reference to FIGS. 3–5, with the understanding that this description applies equally to the construction of tensioning member 28.

As shown in FIGS. 3 and 4, tensioning member 26 includes an outer head portion 36 within which passage 34 is formed, such that roller spindle 30 extends through passage 34 and is rotatably mounted thereto via bearing assembly 32. A plate portion 38 extends inwardly from head portion 36, and is formed integrally therewith. Tensioning member 26 defines an inner shoulder 40 and an outer shoulder 42, disposed between head portion 36 and plate portion 38. The inner surface of plate portion 38 bears against the outer surface of frame side wall 22, and head portion 36 is disposed outwardly of the end of frame 20.

Tensioning member plate portion 38 has a slot 44 formed therein. A pair of openings 46 are formed in frame side wall 22, and slot 44 overlies openings 46. A locking plate 48 bears against the outer surface of tensioning member plate portion 38. Locking plate 48 has a pair of openings 50 formed therein, which have the same spacing as openings 46 in frame side wall 22. A pair of locking screws 52 extend through aligned openings 46 and 50 in frame side wall 22 and locking plate 48, respectively. Each locking screw 52 has a head 54 and a threaded shank 56. Heads 54 are located adjacent the outer surface of locking plate 48, and each shank 56 is threadedly engaged with internal threads formed in a locking sleeve 58 which extends between and bears against the inner surfaces of frame side walls 22, 24. Each head 54 includes a hex opening for receiving the end of an allen wrench or the like, for use in tightening and loosening locking screw 52.

The shank 56 of each locking screw 52 extends through a bearing 60, which is disposed within slot 44 formed in plate portion 38. Bearings 60 facilitate movement of plate portion 38 relative to side wall 22, in a manner to be explained.

Plate portion 38 further includes a passage 62 within which a cam member 64 is received. Cam member 64 has a hex passage 65, and includes an eccentric circular cam surface 66, a circular bearing portion 68 disposed within passage 62, and a stem portion 70 extending outwardly from bearing portion 68. A cam plate 72 includes an opening 74 through which stem portion 70 extends, and cam plate 72 is mounted to plate portion 38 of tensioning member 26 via a pair of fasteners 76, each of which extends through an opening 78 formed in cam plate 72 and into engagement with a threaded passage 80 formed in plate portion 38. A snap ring 82 is received within a groove formed in stem portion 70 outwardly of cam plate 72, to maintain cam member 64 in engagement with tensioning member 26. As will later be explained, cam member 64 functions to adjust the position of tensioning member 26 relative to frame 12, to provide proper tracking of belt 18.

FIGS. 6–9 illustrate the system by which tensioning members 26, 28 are moved to their extended, tensioned positions so as to introduce tension into belt 18.

Referring to FIG. 5, openings 84 and 86 are formed in frame side walls 22 and 24, respectively, inwardly of tensioning members 26 and 28, respectively.

As shown in FIG. 6, a tensioning tool 88 includes a handle portion 90 having a passage 92 at its outer end, and a cam portion defining a cam surface 94 is formed at the inner end of tool 88. Tool 88 further includes a retainer surface 96, and a pivot pin 98 extends through an opening formed in tool 88 adjacent cam surface 94. Pin 98 extends outwardly in opposite directions relative to handle 90 and the cam portion of tool 88 on which cam surface 94 is formed.

Figure 7:
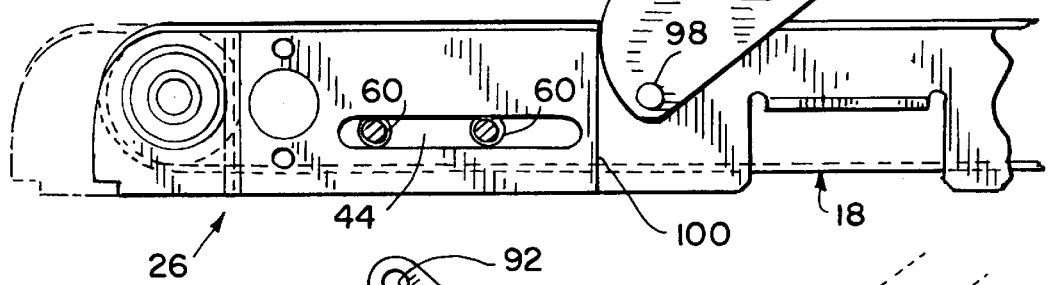
FIG. 7 is a partial side elevation view of the end portion of the conveyor of FIG. 1, showing the tool of FIG. 6 mounted thereto prior to tensioning the belt.
Figure 8:
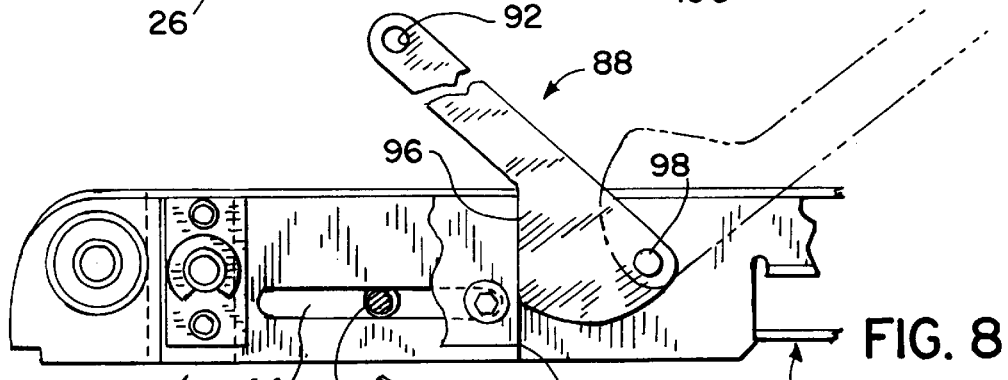
FIG. 8 is a view similar to FIG. 7, showing the tool of FIG. 6 moved so as to tension the belt.

As shown in FIG. 7, tensioning member 26 is moved to a retracted or release position to enable belt 18 to be placed around rollers 14 and 16 or removed therefrom, such that slack is present in belt 18. To tension belt 18 after placement of belt 18 about rollers 14, 16, the user engages tool 88 with frame side wall 22 by placing pin 98 into opening 84. At the same time, the user engages an identical tool 88 with frame side wall 24 by engaging pin 98 thereof with opening 86 in frame side wall 24. The user then positions each tool 88 such that its cam surface 94 is in alignment with the end surface of the adjacent tensioning member. Referring to FIG. 5, the end surface of tensioning member 26 is shown at 100, and the end surface of tensioning member 28 is shown at 102. The user then loosens locking screws 52 relative to locking sleeves 58 to release engagement of locking plate 48 with the outer surface of plate portion, such that tensioning members 26, 28 are slidable relative to frame side walls 22, 24. Tools 88 are then pivoted outwardly about the pivot axis defined by each pin 98, such that cam surface 94 of each tool 88 engages the end surface 100, 102 of each tensioning member 26, 28, respectively. Cam surface 94 is configured so as to push each tensioning member 26, 28 outwardly relative to frame 20 as tool 88 is pivoted outwardly, which movement is accommodated by the walls of slot 44 moving on bearing members 60 as tensioning members 26, 28 are moved outwardly. Tools 88 are pivoted to the position as shown in FIG. 8, in which tensioning members 26, 28 are in their fully extended, tensioned position so as to tension belt 18. Once in this position, the user employs an allen wrench to tighten locking screws 52, to maintain tensioning members 26, 28 in their fully extended, tensioned position and the user removes tools 88 by disengaging pins 98 from openings 84, 86.

Figure 9:
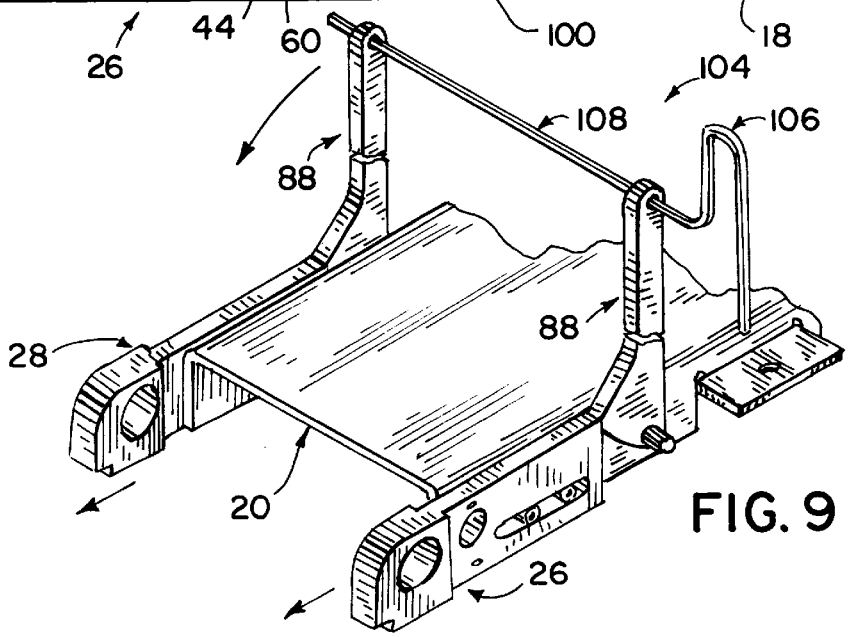
FIG. 9 is a partial isometric view showing a tool as in FIG. 6 mounted to both sides of the end portion of the conveyor of FIG. 1 for synchronously tensioning the belt.

FIG. 9 shows an allen wrench 104 having a handle 106 and a shaft 108, which is sized so as to be engageable with cam member hex passage 65 and the hex passages associated with locking screw heads 54. Tools 88 can be pivoted synchronously utilizing shaft 108 of allen wrench 104 engaged within handle passages 92 of tools 88. The user can grasp shaft 108 of allen wrench 104 between tools 88 and pull in a downward and outward direction, so as to synchronously pivot tools 88 into engagement with tensioning members 26, 28 and to thereby synchronously move tensioning members 26, 28 to their extended positions.

Once tensioning members 26 and 28 are fully extended so as to tension belt 18, the user tightens locking screws 52 to clamp tensioning member plate portion 38 between locking plate 48 and frame side wall 22, to lock tensioning members 26, 28 in their extended, tensioning position. Tools 88 are then removed from frame side walls 22 and 24.

Cam member 64 and cam plate 72 are disengaged from tensioning members 26 and 28 during movement of tensioning members 26 and 28 to their extended, tensioned position. After tensioning members 26 and 28 are extended and retained in their extended position by locking plate 48 and locking connectors 52, the user secures cam plate 72 to tensioning members 26 and 28 by engaging fasteners 76 with threaded passages 80. Fasteners 76 preferably have hex openings sized to receive the shaft of allen wrench 104, similarly to hex passage 65 in cam member 64 and the hex openings in connector heads 54.

The invention as shown and described contemplates two tensioning members, one located on either side of the conveyor frame, for tensioning conveyor belt 18. However, it is also contemplated that a single tensioning member can be used in place of dual tensioning members, to further reduce costs associated with manufacture of conveyor 10. In such an embodiment, one end of roller spindle 30 is fixed in position relative to the frame by a mounting arrangement which accommodates pivotable movement of the roller spindle. After belt 18 has been placed over rollers 14 and 16 with the opposite end of roller spindle 30 being received within a tensioning member such as 26, the user employs a single tool 88 to move the tensioning member to its extended position to thereby introduce tension into conveyor belt 18.

Once conveyor belt 18 is tensioned and cam plates 72 are installed, the user operates conveyor 10 to check tracking of belt 18. If belt 18 tracks toward one side of conveyor 10, cam member 64 is used to make fine adjustments in the position of the tensioning member 26 or 28 on the side of conveyor 10 toward which belt 18 tracks, to extend the tensioning member 26 or 28, as appropriate. This is accomplished by first slightly loosening locking screws 52 using an allen wrench such as 104, and then engaging the end of the allen wrench, such as 104, within cam member hex passage 65. Cam member 64 is then turned in a desired direction and eccentric cam surface 66, which bears against the end of the frame side wall 22 or 24 to which the tensioning member 26 or 28 is mounted, functions to move the tensioning member 26 or 28 slightly as cam member 64 is rotated. Once the desired position of cam member 64 is attained such that belt 18 tracks properly on rollers 14 and 16, the user re-tightens locking screws 52 to once again lock the tensioning member to the associated frame side wall.

In a system in which two tensioning members are used, minor accommodations can be made for belt wear by repositioning the tensioning members as the belt wears and stretches. Once belt wear and stretch has exceeded limits which can be so accommodated, however, it is necessary to replace belt 18 with a new belt.

It can thus be appreciated that the invention provides a very low cost conveyor construction incorporating a positive tensioning mechanism for tensioning the conveyor belt, while providing a high degree of reliability in construction and operation.

Various alternatives and embodiments are contemplated as being within the scope of the following claims particularly pointing out and distinctly claiming the subject matter regarded as the invention.

We claim:

1. In a conveyor including a frame; a conveyor member; at least one roller; a tensioning member movably mounted to the frame and to which the roller is rotatably mounted, wherein the tensioning member is movable between an extended, tensioned position in which the conveyor member is tensioned and a retracted, release position for introducing slack into the conveyor member; and a selectively engageable locking mechanism; the improvement comprising a manually operable tensioning device separable from the frame and from the tensioning member, wherein the tensioning device is selectively engageable with and disengageable from the frame and is movable when engaged with the frame into engagement with the tensioning member for moving the tensioning member to its tensioned position, and wherein engagement of the locking mechanism is operable to selectively maintain the tensioning member in its tensioned position and the tensioning device is subsequently separable and disengageable from the frame and the tensioning member when the locking mechanism is engaged, wherein the locking mechanism is operable to maintain the tensioning member in its tensioned position upon separation and disengagement of the tensioning device.

2. The improvement of claim 1, wherein the tensioning member is slidably mounted to the frame for movement between its tensioned position and its release position, and wherein engagement of the locking mechanism functions to prevent sliding movement of the tensioning member relative to the frame.

3. The improvement of claim 2, wherein the manually operable tensioning device comprises a tool having a handle, a cam surface spaced from the handle, and a pivotable mounting arrangement for pivotably mounting the tool to the frame, wherein pivoting movement of the tool relative to the frame engages the cam surface with the tensioning member to slide the tensioning member to its tensioned position.

4. The improvement of claim 3, wherein the frame includes a recess and wherein the pivotable mounting arrangement for pivotably mounting the tool to the frame comprises a pin mounted to the tool and receivable within the recess such that the tool is pivotable about a pivot axis defined by the pin.

5. The improvement of claim 3, wherein the tensioning member includes an engagement surface with which the cam surface of the tool is engaged for moving the tensioning member to its tensioned position, and wherein the tool includes a retainer surface engageable with the tensioning member engagement surface for maintaining the tensioning member in its tensioned position.

6. The improvement of claim 1, wherein the conveyor frame defines a pair of spaced sides and a tensioning member is mounted to each side of the frame and the roller is rotatably mounted to the tensioning members, and wherein each tensioning device of a pair of manually operable tensioning devices is selectively engageable with and disengageable from the frame and is movable into engagement with one of the tensioning members, wherein the pair of tensioning devices together are operable to move the pair of tensioning members to their tensioned position.

7. The improvement of claim 6, further comprising a synchronizing member interconnected with the pair of tensioning devices for synchronously moving the tensioning devices into engagement with the tensioning members for synchronously moving the tensioning members to their tensioned position.

8. A conveyor system, comprising:

a frame;

a conveyor member;

a pair of rollers about which the conveyor member is trained;

a tensioning member movably mounted to the frame, wherein a first one of the pair of rollers is rotatably mounted to the tensioning member and wherein the tensioning member is movable relative to the frame to a tensioned position in which the conveyor member is tensioned between the pair of rollers by movement of the first roller, and is movable relative to the frame to a release position for introducing slack into the conveyor member by movement of the first roller;

a manually operated tensioning tool separable from the frame and from the tensioning member, wherein the tensioning tool is selectively engageable with the frame and disengageable from the frame, wherein the tensioning tool, when engaged with the frame, is manually movable to engage the tensioning member to move the tensioning member to its tensioned position; and a locking mechanism interconnected with the tensioning member and the frame for selectively maintaining the tensioning member in its tensioned position;

wherein, when the tensioning tool is engaged with the frame and is moved to engage the tensioning member and to move the tensioning member to its tensioned position, the locking mechanism is operable to maintain the tensioning member in its tensioned position, and wherein the tensioning tool is separable and disengageable from the frame and the tensioning member, and wherein the locking mechanism functions to maintain the tensioning member in its tensioned position upon separation and disengagement of the tensioning tool from the frame and the tensioning member.

9. The conveyor system of claim 8, wherein the tensioning member is slidably mounted to the frame for movement between its tensioned and release positions, and wherein the manually operated tensioning tool includes a handle, a cam surface spaced from the handle, and a pivotable mounting arrangement for pivotably mounting the tool to the frame, wherein pivoting movement of the tool relative to the frame engages the cam surface with the tensioning member to slide the tensioning member to its tensioned position.

10. The conveyor system of claim 9, wherein the pivotable mounting arrangement comprises a pin extending from the tool and engageable within a recess associated with the frame, wherein the pin defines a pivot axis about which the tool is pivotable.

11. The conveyor system of claim 9, wherein the tensioning member defines an engagement surface with which the cam surface of the tool is engageable for moving the tensioning member to its tensioned position upon pivoting movement of the tool and engagement of the tool cam surface with the engagement surface, and wherein the tool includes a retainer surface engageable with the tensioning member engagement surface when the tool is pivoted to a predetermined position relative to the frame, for maintaining the tensioning member in its tensioned position.

12. The conveyor system of claim 9, wherein the conveyor frame defines a pair of spaced sides, wherein the tensioning member is movably mounted to one side of the frame and further comprising a second tensioning member mounted to the other side of the frame, wherein the first-mentioned manually operated tensioning tool is manually movable to engage the first-mentioned tensioning member for moving the first-mentioned tensioning member to its tensioned position, and further comprising a second manually operated tensioning tool selectively engageable with the other side of the frame and with the second tensioning member for moving the second tensioning member to its tensioned position.

13. The conveyor system of claim 12, further comprising a synchronizing member interconnected between the first-mentioned and second manually operated tensioning tools for synchronously engaging the first-mentioned and second tensioning tools with the first-mentioned and second tensioning members for synchronously moving the tensioning members to their tensioned position.

14. The conveyor system of claim 8, wherein the tensioning member is slidably mounted to the frame for movement between its tensioned and release position via a slot formed in the tensioning member and at least one connector extending through the slot and interconnected with the frame for providing sliding movement of the tensioning member via engagement of the connector within the slot.

15. The conveyor system of claim 14, wherein the locking mechanism comprises a locking plate through which the connector extends and located adjacent a surface of the tensioning member, wherein the connector includes a head engageable with the locking plate for selectively clamping the tensioning member between the locking plate and the frame.

16. The conveyor system of claim 15, wherein the connector is interconnected with the frame via a sleeve engaging a surface defined by the frame adjacent an opening through which the connector extends, wherein the connector and the sleeve are threadedly engageable with each other.

17. The conveyor system of claim 8, further comprising an adjustment member mounted to the tensioning member and engageable with the frame for adjusting the extended, tensioned position of the tensioning member relative to the frame.

18. The conveyor system of claim 17, wherein the adjustment member comprises a rotatable cam member mounted to the tensioning member and having a cam surface engageable with a surface defined by the frame, wherein rotation of the cam member and engagement of the cam surface with the frame surface functions to vary the position of the tensioning member relative to the frame.

19. In a conveyor including a frame, a conveyor member, and a pair of rollers about which the conveyor member is trained, a method of tensioning the conveyor member, comprising the steps of:

rotatably mounting a first one of the rollers to at least one tensioning member;

movably mounting the tensioning member to the frame for movement between a tensioned position in which the conveyor member is tensioned between the rollers, and a release position for introducing slack into the conveyor member;

providing a tensioning tool which is separable from the frame and from the tensioning member, wherein the tensioning tool is manually engageable with the frame and disengageable from the frame;

engaging the tensioning tool with the frame;

moving the tensioning tool relative to the frame to engage the tensioning member and to move the tensioning member to its tensioned position;

interconnecting the tensioning member with the frame by means of a selectively operable locking mechanism to maintain the tensioning member in its tensioned position; and subsequently separating and disengaging the tensioning tool from the frame and the tensioning member, wherein the locking mechanism is operable to maintain the tensioning member in its tensioned position upon separation and disengagement of the tensioning tool.

* * * * *